Patented Oct. 12, 1943

2,331,671

UNITED STATES PATENT OFFICE 2,331,671

METHOD OF PREPARING MONOALKYLOL CYANAMIDES

Walter P. Ericks, Stamford, Conn., assignor to American Cyanamid Company, New York, N. Y., a corporation of Maine No Drawing. Application January 31, 1942, Serial No. 429,001

5 Claims. (Cl. 260—551)

The present invention relates to the preparation of alkylol cyanamides, more particularly to a novel method of preparing monoalkylol cyanamides.

I have discovered that monoalkylol cyanamides of the formula

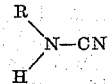

wherein R represents a hydroxyalkyl radical may be obtained by reacting together the corresponding monoalkylol amine, $RNH_2$, and a cyanogen halide, for example, two mols of monoethylolamine and one mol of cyanogen chloride react to form one mol each of monoethylol cyanamide and monoethylolamine hydrochloride, according to the following equation:

$2HOCH_2CH_2NH_2 + CNCl \longrightarrow$

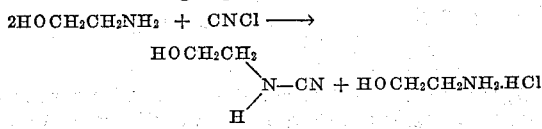

The reaction may be carried out in an inert medium such as an ether-alcohol solution in which the monoalkylol cyanamide is soluble and the monoalkylolamine hydrohalide is insoluble. The amine hydrohalide may be removed by filtration, and the filtrate evaporated to recover the alkylol cyanamide.

It is to be understood that the symbol R, when used hereinafter, will be defined as above.

According to the above reaction it is impossible to obtain more than a 50% yield of the monoalkylol cyanamide based on the quantity of the monoalkylolamine utilized.

I have further discovered that I may react together equimolecular quantities of the monoalkylolamine and the cyanogen halide in such a manner that substantially theoretical yields of the monoalkylol cyanamide (based on the amine used) are obtained. This may be accomplished by first reacting one mol equivalent of the amine with one-half mol equivalent of the cyanogen halide, followed by thorough agitation of the reaction mixture with an amount of aqueous alkali metal hydroxide sufficient to react with the amine hydrohalide present and thus free the amine. This reaction cycle is repeated several times until a total of one mol equivalent of the cyanogen halide is utilized and substantially all of the amine is converted to the cyanamide.

For instance, in the second step, to the reaction mixture containing one-half mol equivalent of the amine there is added one-quarter mol equivalent of the cyanogen halide followed by addition of the requisite amount of alkali to liberate the amine from the amine hydrohalide. The following equations illustrate the procedure according to steps:

Step 1

$1 \text{ mol } RNH_2 + 0.5 \text{ mol } CNCl \longrightarrow$

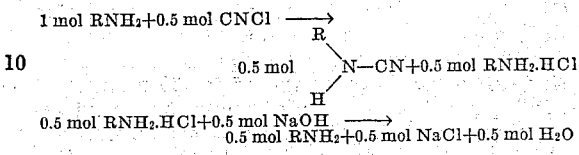

$0.5 \text{ mol } RNH_2.HCl + 0.5 \text{ mol } NaOH \longrightarrow$
$\quad 0.5 \text{ mol } RNH_2 + 0.5 \text{ mol } NaCl + 0.5 \text{ mol } H_2O$ Step 2

$0.5 \text{ mol } RNH_2 + 0.25 \text{ mol } CNCl \longrightarrow$

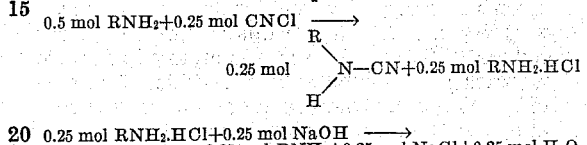

$0.25 \text{ mol } RNH_2.HCl + 0.25 \text{ mol } NaOH \longrightarrow$
$\quad 0.25 \text{ mol } RNH_2 + 0.25 \text{ mol } NaCl + 0.25 \text{ mol } H_2O$ Step 3

$0.25 \text{ mol } RNH_2 + 0.125 \text{ mol } CNCl \longrightarrow$

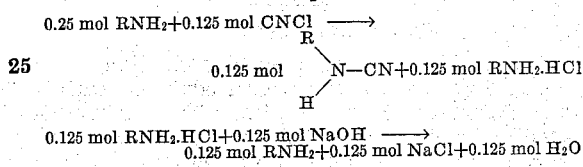

$0.125 \text{ mol } RNH_2.HCl + 0.125 \text{ mol } NaOH \longrightarrow$
$\quad 0.125 \text{ mol } RNH_2 + 0.125 \text{ mol } NaCl + 0.125 \text{ mol } H_2O$ The product may be freed from the alkali metal halide salt by evaporation of water and extraction with alcohol. Inasmuch as the monoalkylol cyanamides polymerize readily, high evaporation temperatures should be avoided and it is preferable to carry out the evaporation under reduced pressures of 10–20 mm. of mercury.

It is exceedingly advantageous to carry out the above procedure in step-wise manner rather than unite at one time one mol equivalent of each of the amine, the cyanogen halide and the alkali, because it avoids contact of the alkali with the cyanogen halide which otherwise would tend to react as follows:

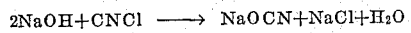

$2NaOH + CNCl \longrightarrow NaOCN + NaCl + H_2O$

The above method also avoids having an excess of alkali metal hydroxide present in the reaction mixture. This is also an important advantage inasmuch as an excess of the alkali would promote polymerization of the monoalkylol cyanamide.

When the monoalkylolamine is a solid, for example, a high molecular weight amine, it is desirable to employ an organic solvent such as, for example carbon tetrachloride, diethyl ether, benzene, toluene or petroleum ether fractions. Water may be employed as the solvent for the low molecular weight amines.

The reaction mixture should be kept cool otherwise the monoalkylol cyanamide and the monoalkylolamine hydrohalide may react together and form the 1,3-dialkylol guanidine hydrohalide according to the following equation:

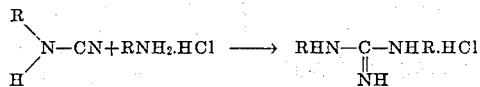

It is also important that a low temperature be maintained when a low boiling halide such as cyanogen chloride is utilized.

Other cyanogen halides may be used. However, as the bromide and iodide are normally solid, they can be conveniently used in a suitable solvent such as diethyl ether.

This invention will be further illustrated by the following examples:

EXAMPLE 1

*Monoethylol cyanamide*

122 grams (2 mols) of monoethylolamine were diluted with 300 cc. of anhydrous ether. The solution was stirred, cooled and held at 5°–10° C., while 61.5 grams (1 mol) of cyanogen chloride were added. Crystalline monoethylolamine hydrochloride formed in the course of the reaction. The mixture was stirred for 30 minutes at 10° C., and then 400 cc. of anhydrous ethyl alcohol were added. After stirring the mixture for an additional hour at 10° C., the crystalline monoethylolamine hydrochloride was removed by filtration. The filtrate was evaporated under a reduced pressure of 14 mm. mercury to remove the ether and alcohol. The residue of monoethylol cyanamide was a pale yellow, oily syrup, readily soluble in water and alcohol, and sparingly soluble in chloroform.

EXAMPLE 2

*Monoethylol cyanamide*

61 g. (1 mol) of monoethylolamine were charged into a reaction vessel equipped with a thermometer and a mechanical stirrer. A graduated cylinder (surrounded by a jacket in which a cold salt brine solution was circulated) was connected to the reaction vessel. Into this cylinder was charged 61.5 g. (1 mol) of cyanogen chloride occupying a volume of 52 cc. Another graduated cylinder containing 42.1 g. (1 mol) of 95% sodium hydroxide dissolved in 200 cc. of water (occupying a volume of 210 cc.) was connected to the reaction vessel.

50 cc. of water were added to the monoethylolamine. The solution was stirred and a temperature of 5° to 10° C. maintained throughout the run. The cyanogen chloride was added periodically to the amine solution. Each addition of the cyanogen chloride was followed by the addition of the sodium hydroxide solution as shown in the following table:

|  | Volume of solution (cc.) | |
| --- | --- | --- |
|  | CNCl | NaOH |
| Original quantity | 52.0 | 210.0 |
| 1st addition | 26.0 | 105.0 |
| 2nd addition | 13.0 | 52.5 |
| 3rd addition | 6.5 | 26.5 |
| 4th addition | 3.5 | 13.0 |
| 5th addition | 1.5 | 6.5 |
| 6th addition | 1.5 | 6.5 |

The reaction mixture was stirred for one hour at 10° C., and then concentrated by evaporation under reduced pressure of 10–15 mm. mercury. A substantial quantity of the sodium chloride (formed in the course of the reaction) precipitated out of the solution. The salt was filtered off and the filtrate extracted with alcohol. Upon evaporation of the alcohol, the product was obtained as a light amber-colored, clear, viscous liquid, equivalent to 88% of the theoretical yield.

EXAMPLE 3

*Monoisopropylol cyanamide*

To a solution consisting of 75 g. (1 mol) of monoisopropylolamine dissolved in 100 cc. of water, maintained at a temperature of 5–10° C., there were added intermittently 61.5 g. (one mol) of cyanogen chloride and 42.1 g. (one mol) of 95% sodium hydroxide dissolved in 200 cc. of water according to the procedure of Example 2. The reaction mixture was stirred for one hour at 5–10° C., and then concentrated in an evaporator under reduced pressure of 10–20 mm. mercury. The precipitated sodium chloride was removed by filtration and the filtrate extracted with alcohol. The alcohol solution was evaporated and the product obtained as a viscous, yellow-colored liquid equivalent to 95% of the theoretical yield.

EXAMPLE 4

*Trimethylol-methyl cyanamide*

121 g. (1 mol) of trimethylol-methylamine,

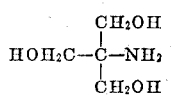

were dissolved in 200 cc. of water. The solution was stirred and cooled to 10° C. 61.5 g. (1 mol) of cyanogen chloride and 42.1 g. (1 mol) of 95% sodium hydroxide dissolved in 200 cc. of water were added intermittently according to the procedure of Example 2. The reaction mixture was stirred for one half hour at 10° C., and then evaporated under reduced pressure. After removing the precipitated sodium chloride, the residue was extracted with alcohol. Upon evaporation of the alcohol, a pale yellow, viscous liquid was obtained.

EXAMPLE 5

*1-methylol-1-methyl-ethyl cyanamide*

184.5 g. of cyanogen chloride and 126.5 g. of 95% sodium hydroxide dissolved in 600 cc. of water were added intermittently to a solution consisting of 267 g. of 1-methylol-1-methyl-ethylamine,

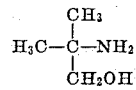

dissolved in 300 cc. of water, according to the procedure of Example 2. The reaction mixture was stirred for 90 minutes at 5–10° C., and then evaporated under reduced pressure of 10–15 mm. mercury. The precipitated sodium chloride was filtered off and the filtrate extracted with alcohol. The alcohol solution was evaporated and the product obtained as a colorless, viscous syrup, equivalent to 90% of the theoretical yield.

Example 6

1,1-dimethylol-ethyl cyanamide 105 g. of 1,1-dimethylol-ethylamine,

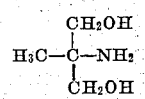

were dissolved in 250 cc. of water. The solution was stirred and cooled to 5° C. 61.5 g. of cyanogen chloride and 42.1 g. of 95% sodium hydroxide dissolved in 200 cc. of water were added intermittently according to the procedure of Example 2. The reaction mixture was stirred for one hour at 5–10° C., and then concentrated in an evaporator under reduced pressure of 10–20 mm. mercury. The precipitated sodium chloride was removed by filtration and the filtrate extracted with alcohol. The alcohol solution was evaporated and the product obtained as a pale yellow, viscous liquid.

Example 7

1-methylol-propyl cyanamide

To a solution consisting of 178 g. of 1-methylol-propylamine,

dissolved in 200 cc. of water, maintained at a temperature of 5–10° C., there were added intermittently 123 g. of cyanogen chloride and 84.2 g. of 95% sodium hydroxide dissolved in 400 cc. of water according to the procedure of Example 2. The reaction mixture was stirred for two hours at 10° C., and then evaporated under reduced pressure of 10–20 mm. mercury. The precipitated sodium chloride was filtered off and the filtrate extracted with alcohol. Upon evaporation of the alcohol, the product was obtained as an amber-colored, clear, viscous liquid.

The compounds prepared according to this invention are of particular utility in the formulation of coating and molding compositions, as textile assistants, as plasticizers and as starting materials for the synthesis of artificial fibers, laminated materials, resins, adhesives and other useful products.

Condensation products of the monoalkylol cyanamides with organic monocarboxylic acids and amines as described in U. S. Patents 2,258,320 and 2,258,321, respectively, are surface-active agents. They are well-suited for wetting and softening wool, cotton, cellulose acetate, cellulose nitrate, viscose and similar threads and fabrics, as emulsifying agents for the preparation of emulsions of hydrocarbon oils, glyceride fats and oils and the like, as well as for de-emulsification of oil emulsions, in the formulation of printing inks, dye pastes, dye baths, as softeners for leather, as flotation agents, in the application of rubber latex emulsions to wool, cotton and rayon textiles, in preparing emulsions of resins and the like.

In the claims, it will be understood that the term monoalkylol cyanamide is intended to cover all isomeric forms in which the monoalkylol cyanamide may exist.

While the invention has been described with particular reference to specific embodiments, it is to be understood that it is not to be limited thereto but is to be construed broadly and restricted solely by the scope of the appended claims.

I claim:

1. The method of preparing a monoalkylol cyanamide of the formula

where R represents a hydroxyalkyl radical, in which equimolecular quantities of the corresponding monoalkylolamine and a cyanogen halide are reacted together which comprises reacting one mol equivalent of the corresponding monoalkylolamine with no more than one-half mol equivalent of a cyanogen halide to form the monoalkylol cyanamide and the monoalkylolamine hydrohalide, thereafter adding to the reaction mixture a quantity of an alkali metal hydroxide sufficient to react with substantially all of the monoalkylolamine hydrohalide present, thus freeing a quantity of the monoalkylolamine, and repeating the steps whereby a quantity of the monoalkylol cyanamide greater than 50% based on the amine used is produced.

2. The method of preparing a monoalkylol cyanamide of the formula

where R represents a hydroxyalkyl radical, in which equimolecular quantities of the corresponding monoalkylolamine and a cyanogen halide are reacted together which comprises reacting one mol equivalent of the corresponding monoalkylolamine with no more than one-half mol equivalent of a cyanogen halide to form the monoalkylol cyanamide and the monoalkylolamine hydrohalide, thereafter adding to the reaction mixture a quantity of an alkali metal hydroxide sufficient to react with substantially all of the monoalkylolamine hydrohalide present, thus freeing a quantity of the monoalkylolamine, and repeating the steps until substantially one mol equivalent of the monoalkylolamine has been reacted with one mol equivalent of the cyanogen halide.

3. The method of preparing a monoalkylol cyanamide of the formula

where R represents a hydroxyalkyl radical, in which equimolecular quantities of the corresponding monoalkylolamine and cyanogen chloride are reacted together which comprises reacting one mol equivalent of the corresponding monoalkylolamine with no more than one-half mol equivalent of the cyanogen chloride to form the monoalkylol cyanamide and the monoalkylolamine hydrochloride, thereafter adding to the reaction mixture a quantity of sodium hydroxide sufficient to react with substantially all of the monoalkylolamine hydrochloride present, thus freeing a quantity of the monoalkylolamine and repeating the steps whereby a quantity of the monoalkylol cyanamide greater than 50% based on the amine used is produced.

4. The method of preparing a monoalkylol cyanamide of the formula

where R represents a hydroxyalkyl radical, in which equimolecular quantities of the corresponding monoalkylolamine and cyanogen chloride are reacted together which comprises reacting one mol equivalent of the corresponding monoalkylolamine with no more than one-half mol equivalent of the cyanogen chloride to form the monoalkylol cyanamide and the monoalkylolamine hydrochloride, thereafter adding to the reaction mixture a quantity of sodium hydroxide sufficient to react with substantially all of the monoalkylolamine hydrochloride present, thus freeing a quantity of the monoalkylolamine, and repeating the steps until substantially one mol equivalent of the monoalkylolamine has been reacted with one mol equivalent of the cyanogen chloride.

5. The method of preparing monoethyl cyanamide in which equimolecular quantities of monoethylolamine and cyanogen chloride are reacted together which comprises reacting one mol equivalent of the monoethylolamine with no more than one-half mol equivalent of the cyanogen chloride to form the monoethylol cyanamide and the monoethylolamine hydrochloride, thereafter adding to the reaction mixture a quantity of sodium hydroxide sufficient to react with substantially all of the monoethylolamine hydrochloride present, thus freeing a quantity of the monoethylolamine, and repeating the steps until substantially one mol equivalent of the monoethylolamine has been reacted with one mol equivalent of the cyanogen chloride.

WALTER P. ERICKS.